March 23, 1926. 1,578,132

J. KAEFER, JR

HAM BOILER AND THE LIKE

Filed July 16, 1924 2 Sheets-Sheet 1

Inventor:
John Kaefer, Jr.,
By H. L. Woodward,
Attorney.

March 23, 1926.

J. KAEFER, JR 1,578,132

HAM BOILER AND THE LIKE

Filed July 16, 1924     2 Sheets-Sheet 2

Inventor
John Kaefer, Jr.,
By H.S. Woodward
Attorney

Patented Mar. 23, 1926.

1,578,132

UNITED STATES PATENT OFFICE.

JOHN KAEFER, JR., OF CINCINNATI, OHIO, ASSIGNOR TO ALUMINUM FOUNDRY COMPANY, OF CINCINNATI, OHIO, A CORPORATION OF OHIO.

HAM BOILER AND THE LIKE.

Application filed July 16, 1924. Serial No. 726,305.

*To all whom it may concern:*

Be it known that I, JOHN KAEFER, Jr., a citizen of the United States, residing at Cincinnati, in the county of Hamilton and State of Ohio, have invented certain new and useful Improvements in Ham Boilers and the like, of which the following is a specification.

The invention has for an object to provide improvements in devices for the cooking meats, and particularly in the preparation of cooking for the higher class of trade. It is a special aim to provide a means for forming meat while being cooked in an attractive shape, suitable for packaging for distribution through the trade channels. It is a particular purpose to provide a device of this kind which may be quickly manipulated to be adjusted upon food units. A further important object of the invention is to provide such a device which will accommodate itself to irregularities in units such as hams, shoulders or other meat units. A further attainment of greater value in the invention is the functioning of the device to accommodate itself to the shrinkage of the meat unit, and also during the yielding of the food when it accommodates itself to the form of the receptacle embodying part of my invention. It is also a purpose of the invention to provide an appliance of this character which will be amply durable, which is adapted to be utilized for cooking receptacles.

Additional objects, advantages and features of invention reside in the construction, arrangement and combination of parts, as will be understood from the following description and from the drawings, wherein Figure 1 is an elevational view of the appliance with parts broken away to show the longitudinal section.

Figure 1:
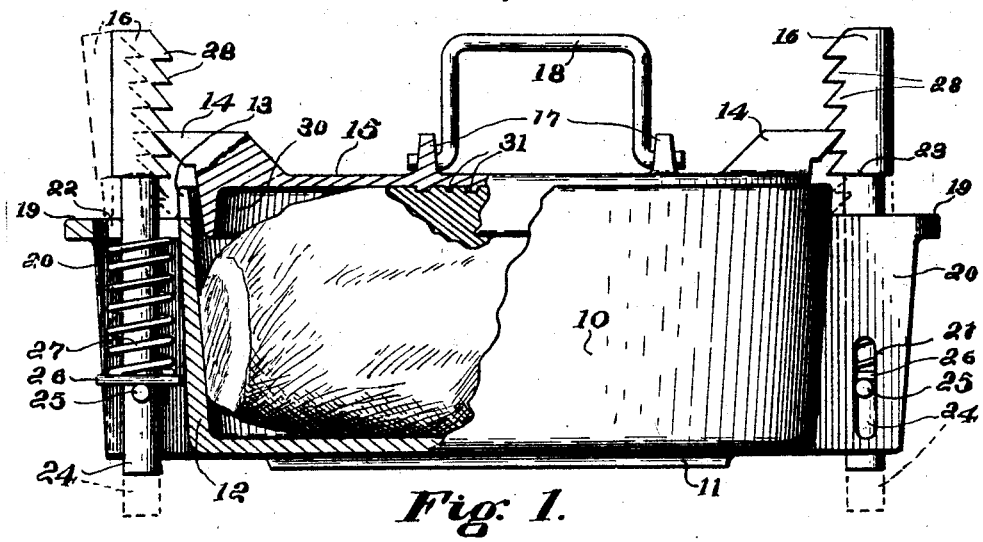
Figure 2:
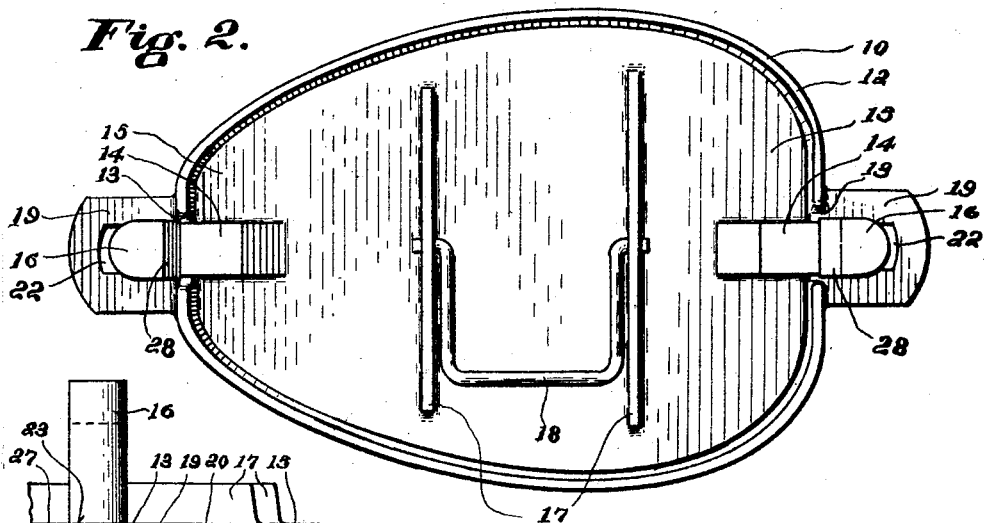
Figure 2 is a top view of the same device.
Figure 3:
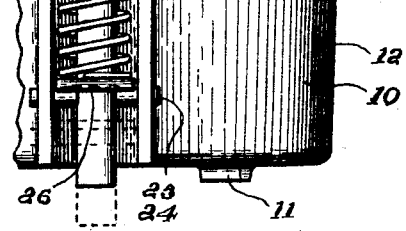
Figure 3 is an end view with one side broken away.

There is illustrated a receptacle 10 which is especially adapted to be used in the cooking of foods and molding thereof to an appropriate shape. In the particular embodiment an approximately heart-shaped form is shown, although this may be varied as found appropriate. The receptacle is provided with longitudinal ribs 11 on the lower side, these being divergent toward the larger end of the receptacle. The wall 12 of the receptacle is inclined outwardly toward its upper part and is also tapered to facilitate molding. The upper edge of this wall is formed with notches 13 therein at each end and a lid 15 is provided to fit loosely in the receptacle, provided with longitudinally projecting lugs 14 at each end adapted to set in the notches and project therethrough a short distance for free vertical movement therein. The outer parts of the lugs are formed with horizontal upper sides and undercut ends to engage suitably and releasably the toothed inner sides of vertical and vertically reciprocable spring pressed presser bars 16 mounted on the receptacle outwardly of the wall 12, by which the lid is engaged and borne downwardly on the contents of the receptacle. The teeth 28 of these bars have downwardly inclined upper sides. These bars may be broadly termed rack elements.

The lid is formed with transverse reinforcing ribs 17, which are also of a length to permit the ribs 11 to rest thereon when another of these devices is set thereover to facilitate stacking of these devices in a cooking chamber or the like. A bail or handle 18 is also provided on the lid, having outturned ends set revolubly in respectively ribs 17.

On each end of the receptacle integral horizontal guide plates 19 are formed, the upper sides of which are at a level with the bottom of the respective notches 13 and extending below these plates from each side thereof there are parallel plates 20 integral with the receptacle wall and the plates 19. The plates 20 have vertical slots 21 formed therein extending upward from near the level of the bottom of the receptacle, each set receiving a guide pin 25 engaged through the respective bars 16. Each plate 19 is formed with an opening 22 therein elongated longitudinally of the receptacle, extending from closely adjacent the wall 12. The lower part of the bar 16 is reduced, forming a shoulder 23 and the opening 22 is narrower than the upper part of the bar 20, so as to check downward movement of the bar at its lower limit of movement. The lower reduced stem 24 of the bar extends downwardly between the plates 20 and is provided with a cross pin 25 projected through the slots 21, which pin rests near the lower ends of the slots when the bar is at the lower limit of its movement. A rectangular washer 26 is engaged around the stem part 24 and a spring 27 is confined between this washer and the plate 19 whereby the bar is held yieldingly at the lower limit of its movement. From the pin 25, the lower end of the bar projects downwardly a distance below the receptacle bottom when the shoulder 23 rests upon the plate 19, as dotted in Figure 1. The elongation of the opening 22 in the plate 19 permits oscillation of the upper part of the presser bar in the medial vertical plane of the receptacle, so that the toothed edge 28 of the bar may be moved outwardly to clear the lugs 14 at times for release of the lid. The lid is provided with a circumscribing flange 30 which may extend downwardly as far as desired or required in the uses of the appliance contemplated.

In the use of the present embodiment of the invention, it is customary to remove the bones of the ham, and then, with the receptacle set upon a suitable table the ham is adjusted therein and the lid is introduced thereover. By application of suitable pressure manually or otherwise to the lid, the meat and the container are forced downwardly, the lower ends of the bars 16 engaging the table and being forced upward, the meat being compressed within the container at the same time. The downward movement of the container serves to further compress the springs after maximum initial compression of the meat. The teeth 28 engage the ends of the lugs 14 and hold the lid in engagement with the content of the receptacle operative to accommodate itself to expansion or shrinkage of the content, so that neither excessive or deficient pressure will develop. In the cooking of the meat it first expands to some extent, the lid yielding to this expansion and moving upward so that no excessive pressure on the tissue is developed, and in the latter part of the cooking, as well as in the cooling afterward, the contents shrink or yield further to the pressure applied through the springs 27, the lid thus being moved downwardly.

Upon completion of the cooking, in order to remove the contents of the receptacle, it is only necessary to bear the upper ends of the bars 16 outwardly from the ends of the receptacle, when the lid will be released and may be lifted off. The contents are then removed and prepared in any further way desired for the market.

By forming embossed or other raised letters 31 upon the inner surface of the lid, a trade-mark, firm name or other similar mark may be impressed in the food at the same time that it is cooked and molded, as will be readily understood.

Figure 4:
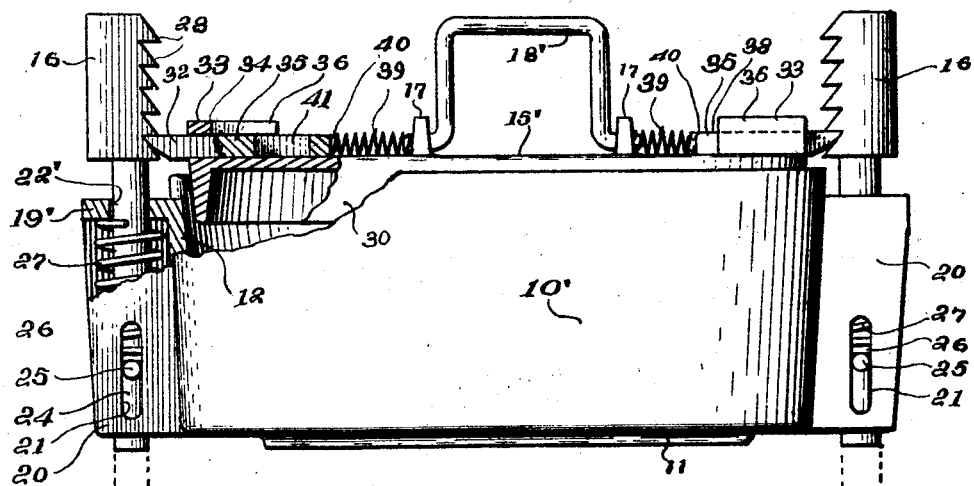
Figure 4 is a similar view to Figure 1 of a modification.
Figure 5:
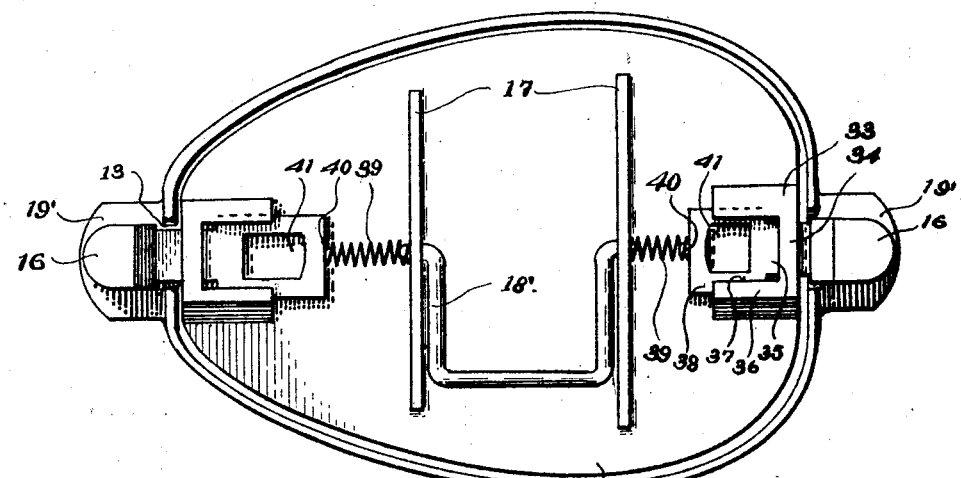
Figure 5 is a top view of the modification.

In Figures 4 and 5 there is illustrated a construction obviating the oscillating movement of the pressure bars, and utilizing sliding spring-pressed bolts on the lid instead.

In this instance, the receptacle 10' differs from the first only in having a smaller opening 22' through the guide plates 19' (the latter consequently projecting less); bars 16 of the same construction as before described being mounted in the same manner on the receptacle, but not free to oscillate in the vertical longitudinal plane of the receptacle, because the openings 22' hold them in vertical position permanently.

The lid 15' has the same form and fit in the receptacle as before indicated, but in place of the lugs 14, before described, guide blocks 33 are provided which may be formed integrally on the lid or attached. These blocks are U-shaped in plan, the bight portions being located immediately at the ends of the lid and being each formed with an opening receiving a bolt 35 slidably therethrough. The arms 36 of each block are undercut to form a channel 37 in which the inner part of the bolt may slide. The opening through the bight is narrower than the channel, and the inner part 38 of the bolt is slightly broadened to fit the channel and be checked at the outer limit of the movement of the bolt. The outer extremity 32 of the bolt is suitably formed to engage the teeth 28 of the bar 16. The bolts are held yieldingly at the outer limits of their movement by means of springs 39 confined between the inner ends of the bolts, and the extremities of the bail 18' projecting through the ribs 17 may be utilized with the ribs to hold the springs in operative position without boxing or other special guiding means, these parts being inserted in the ends of the springs, as shown. The bolts are each provided at their inner parts with openings 41 into which the ends of an operator's fingers may be inserted to retract the bolts when desired, and the arrangement is such that the thumb and little finger of one hand may be employed to retract the bolts while the intervening digits are inserted through the bail 18' to lift the lid, making one manual operation with one hand, only necessary.

The use of this device, except as indicated is the same as with the first described form.

I claim:

In a cooker including a receptacle, a lid movable to and from compressive engagement with a content, and resilient means adjustably coengageable between lid and receptacle to hold the lid yieldingly engaged, including a slidable member on the receptacle and a spring opposing its upward movement; the combination therewith of an extension at the lower part of the slidable member projecting below the bottom of the receptacle when the parts are in disengaged position, movable equally with said slidable member beside the receptacle, and adapted to engage a support under the receptacle.

In testimony whereof I affix my signature.

JOHN KAEFER, Jr.